(12) United States Patent
King et al.

(10) Patent No.: US 6,971,657 B2
(45) Date of Patent: Dec. 6, 2005

(54) DRIVER ACCESS SYSTEM FOR MOTOR TRUCK TRACTOR

(75) Inventors: Harold E. King, Blue Springs, MO (US); Gregory J. Lehman, Lawrence, KS (US); Dean E. Newton, Rantoul, KS (US)

(73) Assignee: Kalmar Industries USA, LLC, Ottawa, KS (US)

( * ) Notice: Subject to any disclaimer, the term of this patent is extended or adjusted under 35 U.S.C. 154(b) by 0 days.

(21) Appl. No.: 10/387,734

(22) Filed: Mar. 13, 2003

(65) Prior Publication Data

US 2004/0178602 A1 Sep. 16, 2004

(51) Int. Cl.$^7$ ................................................ B60R 3/00
(52) U.S. Cl. .................. 280/163; 280/164.1; 182/127; 182/90
(58) Field of Search ................................ 280/166, 163, 280/169, 164.1, 164.2; 296/190.11, 208; 182/206, 127, 91, 92, 83, 84, 85, 90; 290/190.11, 290/208, 164, 166, 203.04

(56) References Cited

U.S. PATENT DOCUMENTS

| | | | |
|---|---|---|---|
| 3,582,132 A | * | 6/1971 | Gunning ................. 296/190.05 |
| 3,802,530 A | | 4/1974 | Purcell et al. |
| 3,831,699 A | * | 8/1974 | Wolter ................... 296/190.11 |
| 4,067,588 A | | 1/1978 | Morge et al. |
| 4,074,788 A | * | 2/1978 | Joubert ................... 296/190.11 |
| 4,416,486 A | | 11/1983 | McNaught et al. |
| 4,909,351 A | * | 3/1990 | Johnson et al. ............... 182/83 |
| 4,957,324 A | * | 9/1990 | Doescher et al. ...... 296/190.11 |
| 5,064,022 A | | 11/1991 | Graham |
| 5,593,167 A | * | 1/1997 | Barnhardt et al. ........ 280/164.1 |
| 6,068,277 A | | 5/2000 | Magnussen |
| 6,179,312 B1 | | 1/2001 | Paschke et al. |
| 6,340,191 B1 | | 1/2002 | Brady |
| 6,347,678 B1 | * | 2/2002 | Osborn et al. ............... 280/163 |
| 6,357,773 B1 | * | 3/2002 | Griebel et al. .............. 280/166 |
| 6,457,558 B1 | * | 10/2002 | Ehnes .......................... 182/90 |
| 6,582,012 B1 | * | 6/2003 | Smith .......................... 296/208 |

* cited by examiner

*Primary Examiner*—Hau Phan
(74) *Attorney, Agent, or Firm*—Gardere Wynne Sewell LLP

(57) ABSTRACT

An access system for a terminal or a yard type motor truck tractor includes three vertically and laterally spaced steps which are mountable on the tractor frame just aft of the tractor cab to provide access between ground level and a deck or platform of the tractor aft of the cab. First and second vertical and laterally spaced steps are mounted on a member supported by one of the tractor frame rails. A third step is separately mounted on the frame rail interposed the second step and the platform and includes handrails disposed adjacent thereto. The access system provides improved access between the tractor rear deck or platform and ground level and reduces user fatigue. A member supporting the first and second steps may form a storage compartment.

13 Claims, 4 Drawing Sheets

DRIVER ACCESS SYSTEM FOR MOTOR TRUCK TRACTOR

BACKGROUND

In the art of motor truck transportation equipment there has been a continuing need to provide improvements in motor truck tractors, particularly, so-called terminal or yard tractors with respect to providing ease of boarding and disembarking from the tractor for tractor operating personnel. With regard to terminal or yard tractors, in particular, an operator, normally the driver, may be required to board and disembark from the tractor many times in a normal working day. In fact, in a typical workday, a terminal or yard tractor driver may be required to board and disembark from the tractor several hundred times while moving semi-trailers about a truck terminal or trailer yard premises. Accordingly, improvements in access systems have been sought to minimize driver fatigue and reduce the likelihood of driver injury, particularly when the driver is required to have access to the area at the rear of the tractor cab for connecting and disconnecting trailer brake and electrical conductors, for example.

Since a driver may, in many instances, desire or be required to move from the rear deck of the tractor to the ground and return to the rear deck and/or the cab via a rearward facing door, improvements have been sought in providing access systems to facilitate ease of boarding and disembarking from the tractor while minimizing driver exertion in so doing and while also complying with industry standards and regulatory requirements, when applicable. It is to these ends that the present invention has been developed.

SUMMARY OF THE INVENTION

The present invention provides an improved access system for persona boarding and disembarking from a motor truck tractor, particularly a so-called terminal or yard tractor.

In accordance with one aspect of the present invention, a multi-step access system or stairway is provided for mounting on a motor truck tractor generally rearward of the tractor cab to provide access between the ground and a rear platform or deck of the tractor when it is required that the driver, or a driver's assistant, gain access to trailer airbrake conductors and/or electrical conductors or other equipment associated with connecting and disconnecting a trailer with respect to the tractor. The access system of the invention accomplishes these objectives while also not interfering with the normal swing area of a trailer connected to the tractor.

The stairway type access system of the present invention advantageously includes a step module including a lower step disposed a predetermined distance above the ground, a second step disposed vertically and horizontally spaced from the first step and a third step disposed with respect to the first and second steps at a third level. The third step is preferably disposed laterally from the first and second steps and adjacent to hand and guardrails to facilitate ease of using the access system when moving between the rear deck of the tractor and the ground.

In accordance with another aspect of the present invention an improved access system for a motor truck tractor is provided which includes multiple vertically spaced steps which are preferably fabricated into step modules and which are advantageously adapted to be attached to a motor truck tractor frame, including one of the conventional longitudinal frame rails of the tractor. The access system includes first and second lower steps which are mounted on a first module which is separately attachable to the tractor frame, generally rearwardly of the tractor cab, and a second module which is separately mountable on the frame to provide a third step disposed above and laterally spaced from the first module. The second module preferably includes one or more handrails, which serve to facilitate use of the access system when boarding or disembarking from the rear deck of a terminal tractor, in particular. At least one of the step modules may be advantageously provided with a battery box or storage compartment which is easily opened by quick release latches. The access system is easily fabricated from conventional structural metal components and may include replaceable perforated metal step pads. The access system may be adapted to mount on either side of the tractor, or access systems may be mounted on both sides thereof.

Those skilled in the art will further appreciate the advantages and superior features of the access system of the present invention upon reading the detailed description which follows in conjunction with the drawings.

DETAILED DESCRIPTION OF A PREFERRED EMBODIMENT

Figure 1:
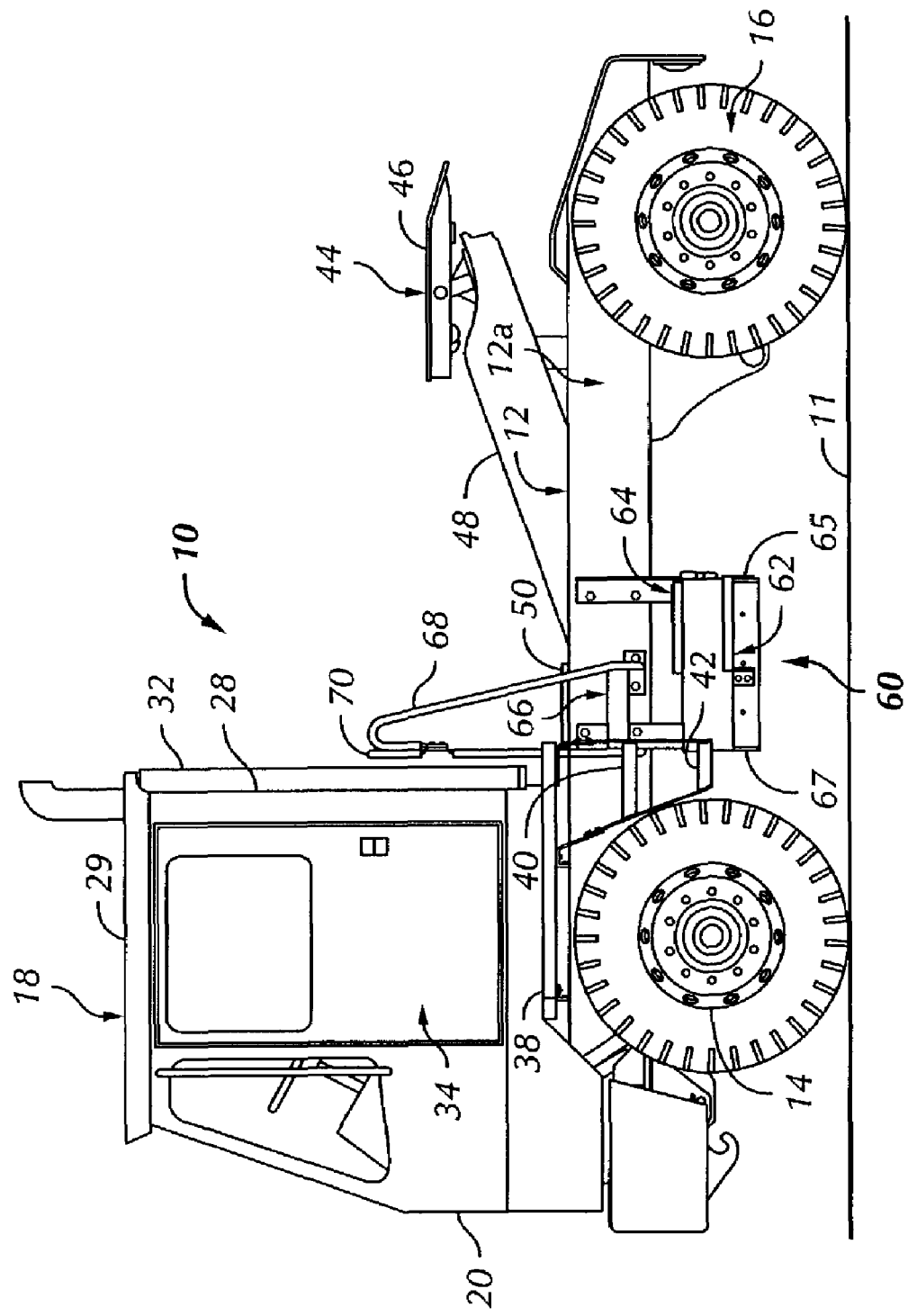
FIG. 1 is a side elevation of a motor truck tractor showing the improved driver access system of the present invention.

In the description which follows like parts are marked throughout the specification and drawing with the same reference numerals, respectively. The drawing figures may not necessarily be to scale in the interest of clarity and conciseness.

Figure 2:
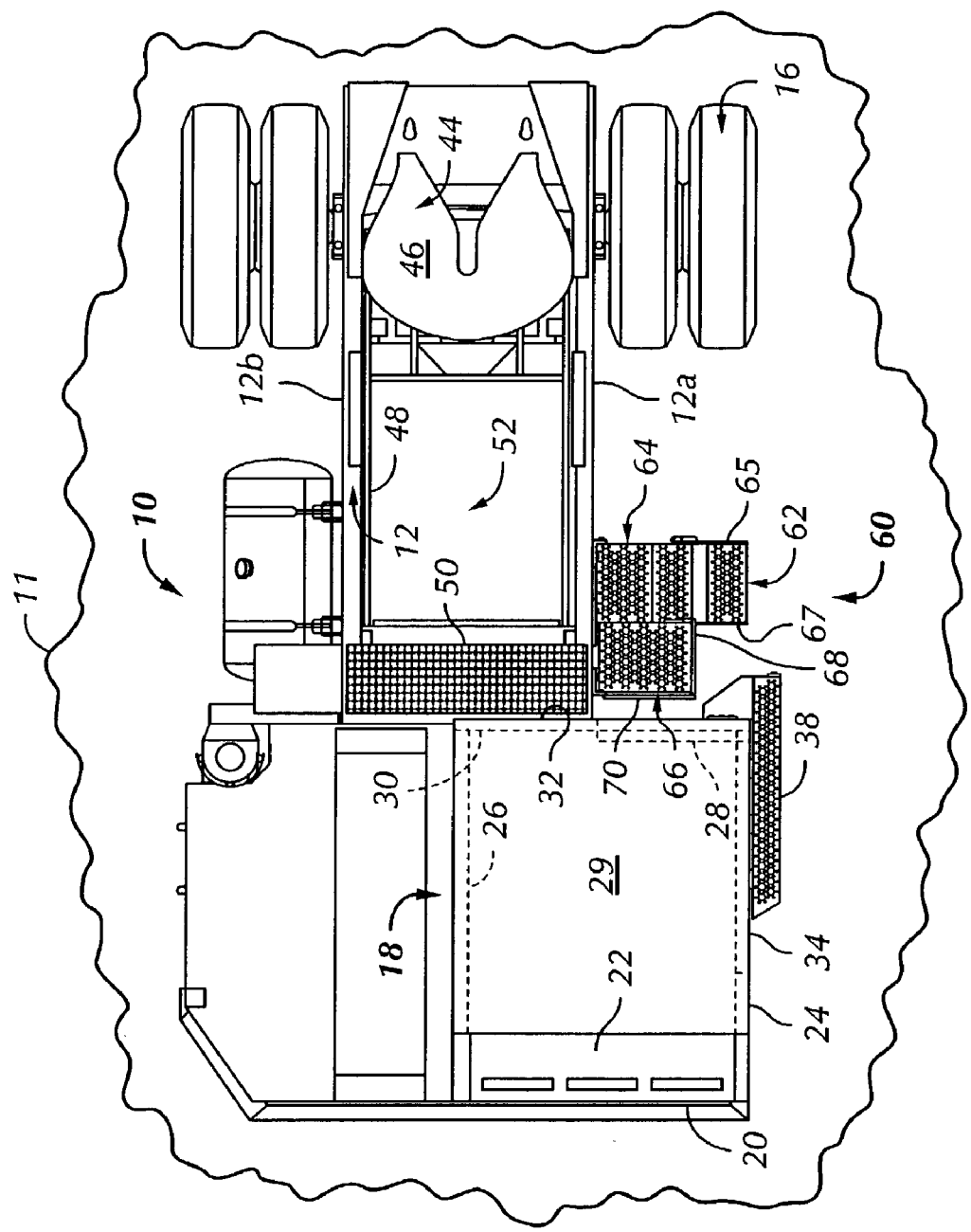
FIG. 2 is plan view of the truck tractor shown in FIG. 1.

Referring to FIGS. 1 and 2, there is illustrated a motor truck tractor 10, including a frame 12, a front axle assembly 14, FIG. 1, and a rear axle assembly 16. The tractor 10 includes a driver's cab 18 of generally conventional construction including a front wall 20, windshield 22, opposed sidewalls 24 and 26, a rear wall 28 and roof 29. Rear wall 28 includes an opening or doorway 30 and a slidable door 32 closable over same. A conventional cab access door 34 is provided in side wall 24 and a conventional driver access platform or running board 38 is disposed adjacent and below door 34. Spaced apart access steps 40 and 42, FIG. 1, are disposed below platform or running board 38 to provide ingress and egress from the cab 18 by the tractor driver via door 34.

Referring further to FIGS. 1 and 2, the tractor 10, which is configured particularly as a terminal or yard tractor, includes a fifth wheel assembly 44 including a conventional fifth wheel 46 and a pivotable boom 48 supporting same and suitably secured to the frame 12 in a known manner. Frame 12 includes spaced apart longitudinal frame rails 12a and 12b, FIG. 2, which support the fifth wheel assembly 44 and an access deck or platform 50 extending transversely across the back of cab 18. Platform or deck 50 is preferably formed of skid resistant metal plate. Moreover, boom 48 also, preferably, includes a skid resistant deck or plate 52, see FIG. 3 also. Platform or deck 50 provides a surface for movement of the tractor operator or driver on the tractor 10 for purposes of connecting and disconnecting hydraulic and/or pneumatic conductors and electrical conductors with respect to a trailer, not shown, during trailer hitching and unhitching operations.

Those skilled in the art will recognize that so-called terminal or yard tractors are operated in such a manner that the driver or operator is required to make many trips during a workday onto the platform or deck 50 to connect and disconnect the aforementioned conductors with respect to trailers that are being moved about a truck terminal or yard. Accordingly, driver ingress and egress with respect to the cab 18 may be made through the door 32 during such operations. Normal operation when hitching and unhitching trailers strongly favors use of the rear doorway 30 and door 32 for access between cab 18 and platform or deck 50. Moreover, there are many instances during trailer hitching and unhitching operations wherein the tractor driver or operator is required to move to the ground 11, FIG. 1, and return to the tractor 10 at the deck or platform 50, such as when required to chock and unchock trailer wheels and open and close trailer swing doors, for example. In this regard there has been a continuing need to provide an improved truck tractor access system with respect to the platform 50, as well as the cab 18, and the ground 11, in addition to the access system provided by the running board 38 and the steps 40 and 42.

Figure 3:
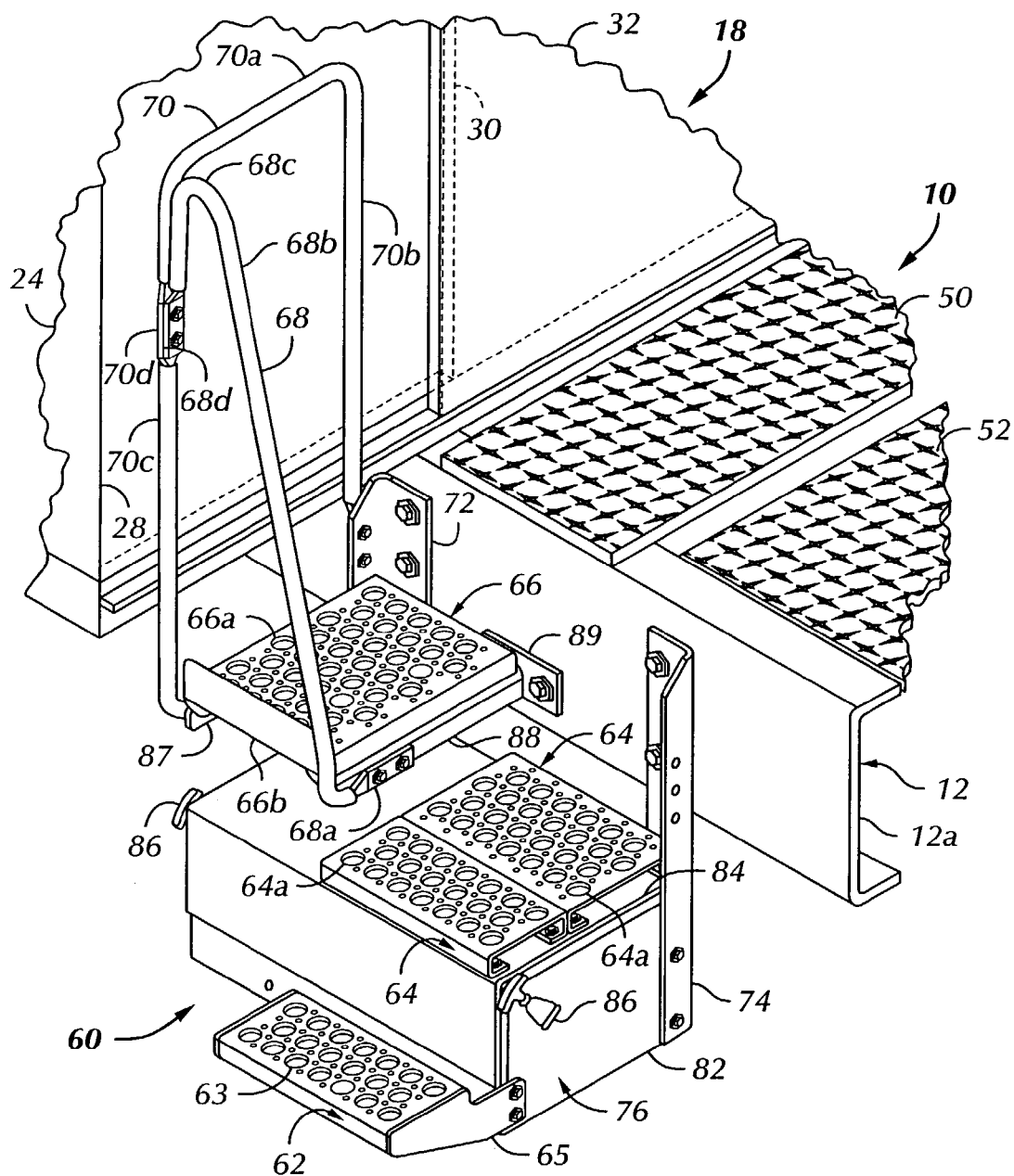
FIG. 3 is a perspective view of the access system shown in FIGS. 1 and 2.

The present invention provides an improved access system, generally designated by the numeral 60 in FIGS. 1 through 5. Access system 60 comprises vertically and horizontally spaced steps 62 and 64, and a third vertically spaced but also horizontally or laterally spaced step 66, as shown in FIGS. 1 through 5. Access system 60 further includes a hand or guardrail 68 and a hand or guardrail 70, disposed just rearward of cab 18 and adjacent to the rear wall 28. As shown in FIGS. 2 and 3, steps 62 and 64 are displaced horizontally with respect to each other in a direction generally normal to longitudinal frame rail 12a. Step 66 is disposed vertically above step 64 and displaced horizontally or laterally in another direction generally parallel to longitudinal rail 12a and between step 64 and cab 18. Steps 62, 64, 66 and platform 50 provide a stairway between the ground 11 and the platform so that a person may move between the platform and the ground, comfortably. Combination hand and guardrails 68 and 70 also minimize the chances of a person moving between deck 50 and step 66 of making a misstep and missing step 64, in particular. Still further, step 66 provides for effectively increasing the span of a work surface on which the driver or operator may stand while working to connect or disconnect the aforementioned conductors, particularly those disposed generally at the front left side of a trailer, not shown.

Accordingly, when a person desires to move from ground 11 to the deck 50, such person may move onto step 62, then step 64, then move laterally to step 66 and finally to deck or platform 50, while holding rails 68 and 70, as needed, to maintain one's balance and to minimize the chance of falling during either movement from the ground 11 to the platform or deck 50 or during movement from the platform to the ground. User comfort is enhanced by providing for three steps, 62, 64 and 66 which are vertically spaced apart but are all interposed the deck or platform 50 and the ground 11.

Preferred dimensions for the access system 60 include a step height of the step 62 from ground 11 of about 19.10 inches, a step rise between steps 62 and 64 and steps 64 and 66 of about 7.70 inches, respectively, a step width for the steps 62 and 64 of about 14.30 inches, a step width for the step 66 of about 16.0 inches, measured in a lateral direction with respect to the longitudinal frame rail 12a tractor 10. The depth of step 62, measured in the same direction as the width of step 66 is preferably about 9.40 inches and the depth of step 64, also measured in the same direction as the width of step 66 is preferably about 16.40 inches. The overall height of rails 68 and 70 from step 66 is preferably about 38.0 inches.

Figure 4:
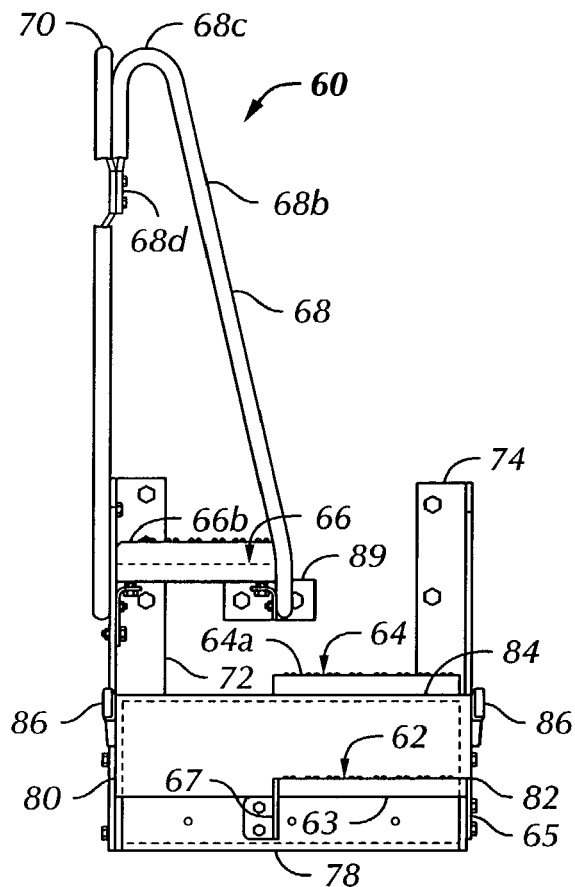
FIG. 4 is a side elevation of the access system shown in FIGS. 1 through 3.
Figure 5:
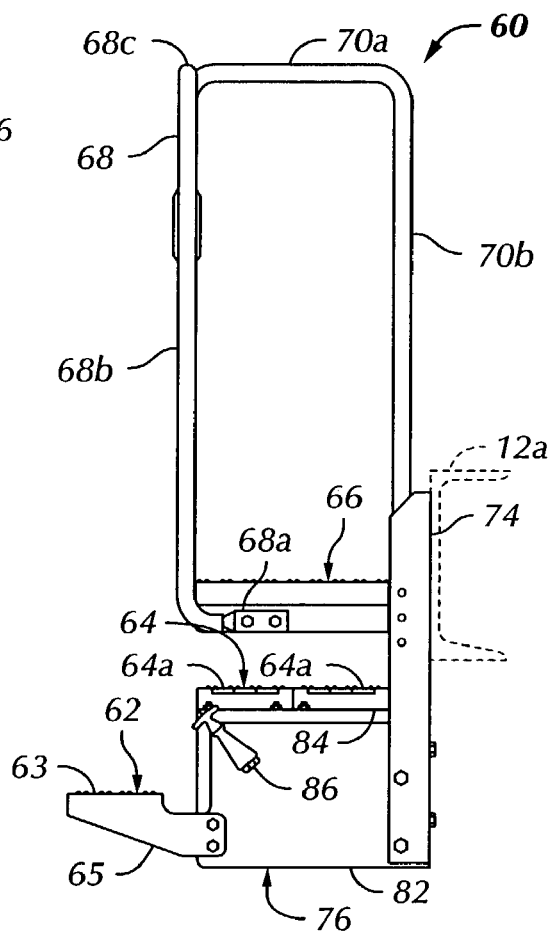
FIG. 5 is an end view of the access system shown in FIGS. 1 through 4.

Referring now to FIGS. 3 through 5, the access system 60 is preferably mounted on frame 12, as illustrated. In particular, step 62 is mounted on structure which supports step 64, which structure, in turn, is supported by spaced apart metal angle members 72 and 74 and secured to frame rail 12a, as shown in FIG. 3, by conventional machine bolts or the like. Structure which supports step 64, as well as step 62, is generally designated by numeral 76 and comprises a metal box like member including at least a bottom wall 78, FIGS. 4 and 5, and opposed sidewalls 80 and 82, FIG. 4, which are suitably secured to angle members 72 and 74 by conventional mechanical fasteners. Step 64 is supported by a right angle shaped cover 84 which is removeably secured to the aforementioned box member 76 by spaced apart latches 86, thus forming a storage compartment, which may, preferably, be used for supporting a tractor battery or hydraulic system oil reservoir, not shown, or serve as a toolbox.

Step 62 comprises a shallow "C" shaped perforated metal channel member 63, FIGS. 3 and 4, supported on box member 76 by spaced apart gusset plates 65 and 67. Step 64 is also preferably formed of two "C" shaped perforated metal channel members 64a supported side by side and suitably removeably secured to cover member 84 by mechanical fasteners.

Referring further to FIGS. 3 through 5, step 66 is preferably constructed of spaced apart angle shaped frame members 87 and 88 which support a step plate 66a, also preferably formed of a "C" shaped channel member of perforated metal. The angle shaped frame members 87 and 88 are secured to channel member 72 and to a gusset plate 89, respectively. Gusset plate 89 is adapted to be bolted to longitudinal frame rail 12a, as shown in FIG. 3. Step 66 also includes a kick plate or toe rail 66b, FIGS. 3 and 4. Steps 62, 64 and 66 each provide a horizontal, generally planar, skid resistant and self-cleaning tread surface, as shown.

Handrail 68, characterized by a tubular metal member which is provided with a lower turned and flattened end 68a, is secured to angle member 88 by conventional mechanical fasteners, includes an elongated inclined rail part 68b, a curved crest part 68c and a depending stanchion part 68d. Part 68d is also flattened at its distal end to provide a point of connection between rail 68 and rail 70.

Handrail 70 comprises a tubular metal member and includes a horizontal rail part 70a and spaced apart depending rail parts or stanchions 70b and 70c. Stanchion 70c is flattened at 70d to provide a point of connection between rail 70 and rail 68 at rail end part 68d. The depending stanchions 70b and 70c are suitably secured to angle member 72 and the step frame member 87 by mechanical fasteners, also.

Those skilled in the art will appreciate from the foregoing description that an improved access system for providing ingress and egress with respect to a rear deck or platform of a terminal tractor and the like is provided by the present invention. The separate step assemblies for the steps 62, 64 and 66 provide ease of repair in the event of damage to any one of these components. Each step assembly is also advantageously of modular construction and is advantageously mounted on a tractor frame, including a convenient place of mounting on a longitudinal frame rail just aft of the tractor cab. In this way the access system is mounted such that it does not add weight to the cab, which is an advantage for cabs which are of the so called tilt type. Accordingly, the access system 60 remains operable when the cab 18 is tilted forward to provide ease of access between the platform or deck 50 and the ground 11 for persons working on the tractor 10 during servicing and repair thereof, also. Moreover, by providing at least three steps with suitable step rise between ground 11 and a fourth step or deck or platform 50, persons moving between the ground and the deck or platform experience reduced fatigue and greater comfort or ease of such movement. Still further, the access system 60 provides a stairway which includes suitable rise, step depth and step width without protruding laterally beyond the wheels of axle assemblies 14 and 16. Thus, the access system 60 is disposed within the normal profile or envelope of the tractor 10, as shown in FIG. 2. The access system 60 further provides for a person to board and disembark from the tractor and is constructed in a way such that it will not interfere with the normal swing area of a trailer connected to the tractor.

The access system 60 may be fabricated using conventional manufacturing methods for components of motor truck tractors. The components of the access system 60 are also fabricated of conventional engineering materials including steel or aluminum metal members, also typically of specifications suitable for motor truck components. Although a preferred embodiment of an access system for a motor truck tractor, particularly a so called terminal or yard tractor is disclosed herein those skilled in the art will recognize that various substitutions and modifications may be made without departing from the scope and spirit of the appended claims.

What is claimed is:

1. An access system for a motor truck tractor providing for boarding and disembarking from a platform disposed on said tractor, said tractor including a longitudinal frame, a front axle assembly, a rear axle assembly and a driver's cab disposed on said frame and including a rear wall extending transversely with respect to a longitudinal extent of said frame, said platform being disposed on said frame rearwardly of said rear wall, said access system comprising:
   a first step supported on said frame between said axle assemblies rearward of said cab and between ground level and said platform;
   a second step disposed above said first step and laterally in a direction toward said frame with respect to said first step; and
   a third step disposed above said second step and displaced longitudinally along said frame with respect to said first and second steps in a direction toward said rear wall and disposed adjacent to and below said platform.

2. The access system set forth in claim 1 including:
   a first handrail disposed adjacent said third step for grasping by a person standing on said access system between said platform and ground level.

3. The access system set forth in claim 2 including:
   a second handrail disposed adjacent said first handrail and said third step for grasping by a person moving between said platform and said third step.

4. The access system set forth in claim 1 wherein:
   said third step is mounted on a support member connected to said frame adjacent said platform and said support member supports a first handrail.

5. The access system set forth in claim 4 wherein:
   said first handrail includes a part extending at an acute angle with respect to the vertical.

6. The access system set forth in claim 4 including:
   a second handrail connected to and extending generally normal to said first handrail.

7. The access system set forth in claim 1 including:
   a support member secured to said frame for supporting said first step and said second step.

8. The access system set forth in claim 7 wherein:
   said support member includes a storage compartment.

9. The access system set forth in claim 8 wherein:
   said support member includes a cover movable between an open and closed position and latch means for holding said cover in said closed position.

10. The access system set forth in claim 1 including:
    a support member mounted on said frame and at least partially supporting said third step and at least one of first and second handrails.

11. An access system for a motor truck tractor providing for boarding and disembarking from a platform disposed on said tractor, said tractor including a longitudinal frame, a front axle assembly, a rear axle assembly and a driver's cab disposed on said frame and including a rear wall extending transversely with respect to a longitudinal extent of said frame, said platform being disposed on said frame extending transversely and rearwardly of said rear wall, said access system comprising:
    first, second and third steps supported on said frame between said axle assemblies on one side of said frame and disposed so as not to extend laterally outward from said frame beyond the lateral extent of said rear axle assembly;
    said first step is supported on said frame by a first support member rearward of said cab and between ground level and said platform;
    said second step is supported by said first support member above said first step and laterally in a direction toward said frame with respect to said first step; and
    said third step is disposed above said second step and is displaced longitudinally along said frame with respect to said first and second steps in a direction toward said rear wall and adjacent to said platform.

12. An access system for a motor truck tractor providing for boarding and disembarking from a platform disposed on said tractor, said tractor including a longitudinal frame comprising spaced apart longitudinal frame rails, a front axle assembly, a rear axle assembly and a driver's cab disposed on said frame and including a rear wall extending transversely with respect to a longitudinal extent of said frame, said platform being disposed on said frame and extending transversely between said frame rails rearwardly of said rear wall, said access system comprising:
    a first step supported on one of said frame rails between said axle assemblies rearward of said cab and between ground level and said platform;
    a second step supported on said one frame rail and disposed above said first step and laterally in a direction toward said one frame rail with respect to said first step; and
    a third step supported on said one frame rail above said second step and displaced longitudinally along said one frame rail with respect to said first and second steps in a direction toward said rear wall and adjacent to and below said platform.

13. The access system set forth in claim 12 including:
    a storage box support member connected to said one frame rail;
    said first step is connected to said support member and extends laterally outward therefrom away from said one frame rail; and
    said second step is disposed on and supported by a movable cover for said support member.

* * * * *